United States Patent [19]
Salway

[11] 3,883,751
[45] May 13, 1975

[54] ELECTRICAL SYSTEMS FOR VEHICLE SAFETY HARNESS

[75] Inventor: Peter Hugh Salway, Birmingham, England

[73] Assignee: The Lucas Electrical Company Limited, Birmingham, England

[22] Filed: Jan. 11, 1974

[21] Appl. No.: 432,614

[30] Foreign Application Priority Data
Feb. 7, 1973   United Kingdom................. 6011/73

[52] U.S. Cl. ......... 307/10 SB; 340/52 E; 180/82 C; 340/278
[51] Int. Cl. .......................................... B60r 21/10
[58] Field of Search ............... 340/52 R, 52 E, 278; 180/82 C; 307/10 SB

[56] References Cited
UNITED STATES PATENTS
3,742,448   6/1973   Motz ................................ 340/52 E Primary Examiner—Herman Hohauser

[57] ABSTRACT

A road vehicle electrical system has a safety arrangement for ensuring that the vehicle cannot be started unless the driver seat is occupied and the driver's seat belt is fastened. The engine cannot be started if the driver fastens his belt before sitting in his seat, or if the passenger's belt is fastened prior to the passenger seat being occupied.

4 Claims, 1 Drawing Figure

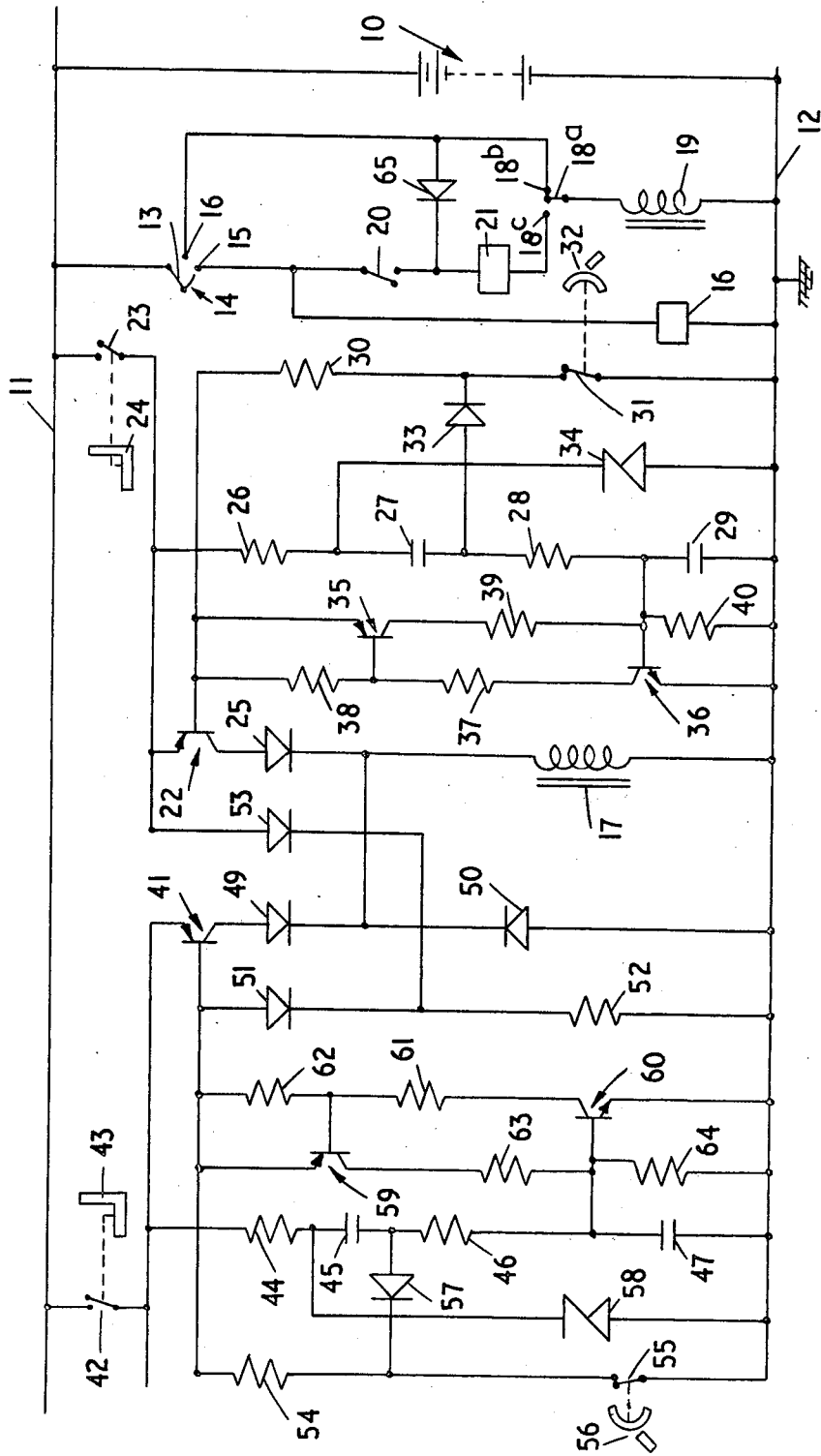

ELECTRICAL SYSTEMS FOR VEHICLE SAFETY HARNESS

This invention relates to electrical systems for use with vehicle safety harnesses and has as its object the provision of such a system in a convenient form.

According to the invention a road vehicle electrical system comprises in combination a solenoid which when energised operates the starter motor of the vehicle, a manually operable switch for energising the starter motor, a normally closed relay contact between the starter switch and the solenoid, a relay winding for opening the contact, first and second supply lines coupled to the vehicle battery, a first control network connecting the relay winding between the supply lines when the driver's seat is occupied and the driver's seat belt is not fastened, and a second control network connecting the relay winding between the supply lines when the passenger's seat is occupied and the passenger's seat belt is not fastened.

Preferably, the first control network also connects said relay winding between the supply lines if the driver's seat belt is fastened prior to the driver's seat being occupied.

Preferably, the second control network also connects said relay winding between the supply lines if the passenger's seat belt is fastened prior to the passenger's seat being occupied.

Desirably, the second control network also connects the relay winding between the supply lines if the passenger's seat is occupied but the driver's seat is not occupied irrespective of whether the passenger's seat belt is fastened or not fastened.

The invention will now be more particularly described with reference to the accompanying drawing which is a circuit diagram illustrating one embodiment of an electrical system according to the invention.

Referring to the drawing, a road vehicle has a battery 10, the positive terminal of which is connected to a supply line 11, and the negative terminal of which is connected to a supply line 12 which is earthed. The supply line 11 is connected to the movable contact 13 of a combined ignition and starting switch 14, the contact 13 being movable from the off position shown to an ignition position in which it engages a contact 15 connected to the line 12 through the ignition-controlled loads 116 of the vehicle, and a start position in which it engages the contact 15 and a contact 16. The contact 13 is spring loaded out of engagement with the contact 16.

The system includes a relay having a winding 17 and a change-over contact 18a. The movable contact 18a normally engages a fixed contact 18b which, when the movable contact 13 of the ignition/and starting switch 14 engages the contact 16, connects an engine-starting solenoid 19 between the supsply lines 11 and 12, the solenoid 19 when energised operating the starter motor of the road vehicle. When the relay winding 17 is energised, the movable contact 18a moves into engagement with a fixed contact 18c. The contact 15 of the combined ignition and starting switch 14 is connected through a series circuit including a switch 20 which is operated by the gear lever or automatic transmission control of the vehicle, and an audible and/or visual warning device 21, to the terminal 18c. The terminal 16 of the switch 14 is connected to the anode of a diode the cathode of which is connected to the junction of the switch 20 and the device 21.

A p n p transistor 22 has its emitter connected to the line 11 through a normally open switch 23 which closes when somebody sits on the driver's seat of the vehicle, the seat being indicated diagrammatically at 24. The collector of the transistor 22 is connected to the anode of the diode 25 the cathode of which is connected through the relay winding 17 to the line 12. The emitter of the transistor 22 is also connected through a series circuit comprising a resistor 26, a capacitor 27, a further resistor 28 and a further capacitor 29 to the line 12. The base of the transistor 22 is connected to the line 12 through a series circuit comprising a resistor 30 and a normally closed switch 31 which opens when the driver's seat belt, indicated diagrammatically at 32, is secured. The junction of the capacitor 27 and the resistor 28 is connected to the anode of the diode 33 the cathode of which is connected to the junction of the resistor 30 and the switch 31. Moreover a zener diode 34 bridges the capacitors 27 and 29 and the resistor 28.

A bistable circuit includes a p n p transistor 35 and an n p n transistor 36 the emitter of which is connected to the line 12. The collector of the transistor 36 is connected through a pair of series connected resistors 37 and 38 to the base of the transistor 22. The junction of the resistors 37 and 38 is connected to the base of the transistor 35 the emitter of which is connected to the base of the transistor 22. The collector of the transistor 35 is connected through a pair of series connected resistors 39 and 40 to the line 12, the junction of the resistors 39 and 40 being connected on the one hand to the base of the transistor 36 and on the other hand to the junction of the resistor 28 and the capacitor 29.

A further p n p transistor 41 has its emitter connected to the supply line 11 through a normally open switch 42 which closes when somebody sits in the passenger's seat of the vehicle, the seat being indicated diagrammatically at 43. The emitter of the transistor 41 is also connected to the supply line 12 through a series circuit comprising a resistor 44, a capacitor 45, a further resistor 46 and a further capacitor 47. The collector of the transistor 41 is connected to the anode of a diode 49 the cathode of which is connected on the one hand to the junction of the diode 25 and the relay winding 17, and on the other hand to the cathode of the diode 50 the anode of which is connected to the line 12. The base of the transistor 41 is connected to the anode of a diode 51 the cathode of which is connected through a resistor 52 to the line 12, the junction of the diode 51 and the resistor 52 being connected to the cathode of a diode 53 the anode of which is connected to the emitter of the transistor 22. The base of the transistor 41 is also connected to the line 12 through a series circuit comprising a resistor 54 and a normally closed switch 55 which opens when the passenger's seat belt, indicated diagrammatically at 56, is secured. The junction of the capacitor 45 and the resistor 46 is connected to the anode of a diode 57 the cathode of which is connected to the junction of the resistor 54 and the switch 55. Moreover, the capacitors 45 and 47 and the resistor 46 are bridged by a zener diode 58.

A further bistable circuit includes a p n p transistor 59 and an n p n transistor 60 the emitter of which is connected to the line 12. The collector of the transistor 60 is connected through a pair of series connected resistors 61 and 62 to the base of the transistor 41, the junction of the resistors 61 and 62 being connected to the base of the transistor 59. The emitter of the transistor 59 is connected to the base of the transistor 41 and the collector of the transistor 59 is connected through a pair of series connected resistors 63 and 64 to the line 12. The junction of the resistors 63 and 64 is connected on the onehand to the base of the transistor 60 and on the other hand to the junction of the resistor 46 and the capacitor 47.

In operation, when the switch 23 closes and if the switch 31 is closed, that is to say the driver's seat belt is not secured, the capacitor 27 charges through resistor 26, diode 33 and the switch 31. Thus, the transistors 35 and 36, which are normally turned off, will remain off. Base current for the transistor 22 is furnished through the resistor 30 and the switch 31. Therefore, transistor 22 will turn on and thereby energise the relay winding 17 through the diode 25. Thus, the contact 18a will be drawn into engagement with the contact 18c thereby preventing energisation of the engine starting solenoid 19. When the movable contact 13 of the combined ignition and starter switch 13 is moved so as to engage contacts 15 and 16, the warning device 21 will be energised through a diode 65, which is connected between the junction of the switch 20 and the warning device 21, and the terminal 16, but the current drawn through the solenoid 19 will be insufficient to cause energisation of the latter. The switch 20 is closed when a gear is engaged, or in the case of an automatic transmission vehicle when the automatic transmission is engaged, or alternatively when the vehicle hand brake is off. Thus, if the winding 17 is energised then the warning device 21 will be energised by closure of the switch 20 irrespective of whether the movable contact 13 engages the contact 16 of the switch 14 or not.

Now if the switch 31 is opened by the driver securing his safety belt, the base current supply to the transistor 22 is removed and thus, transistor 22 will turn off. As a result the relay winding 17 will de-energise and the contacts 18a and 18b will re-engage. Subsequent movement of the movable contact 13 of the switch 14 in to engagement with the contact 16 will cause energisation of the engine-starting solenoid 19. If the driver removes his safety belt whilst the vehicle engine is running, then the warning device 21 will be energised when the switch 20 is closed.

Now if the driver's seat belt 32 is secured, thereby opening the switch 31, before somebody sits on the driver's seat 24, the capacitor 27 will charge, as soon as the switch 23 is closed, through the resistor 26 and the resistors 28 and 40. The transistor 36 will thus turn on and as a result of this transistor 35 will also turn on. Base current will thus be supplied to the transistor 22 through both the transistor 36 and the transistor 35, and the transistor 22 will turn on, thereby energising the relay winding 17. Further operation of the switch 31 will not affect the condition of the bistable circuit and the transistors 35 and 36 will remain on until the swtich 23 is opened once again.

If someone sits in the passenger's seat 43, the switch 42 will close and unless the switch 55 is subsequently opened by securing the passenger's seat belt 56, base current will be supplied to the transistor 41 which will also energise the relay winding 17 through the diode 49. Moreover, if the switch 55 is opened prior to closure of the switch 42 the capacitor 45 will charge through the resistors 45, 46 and 64 thereby turning on the transistors 60 and 59 of the further bistable circuit and supplying base current to the transistor 41 through the transistors 59 and 60.

Furthermore, if the switch 23 (or the switch 42) is opened for less than a predetermined time period, then the associated bistable circuit will not be triggered because the discharge time of the capacitor 27 (or the capacitor 45) through the resistor 40 (or the resistor 64) is sufficient to prevent such triggering of the associated bistable circuit. Thus the circuit is immune to misoperation due to bounce on the switches 23 and 42 associated with the seats 24 and 43 respectively.

The zener diodes 34 and 58 prevent transient changes of supply voltage (for example during engine starting) from causing a current pulse through the capacitor 27 or the capacitor 45 turning on the bistable circuit. The diodes 25 and 49 isolate the two control systems from each other and the diode 50 protects the transistors 22 and 41 from voltage transients caused by de-energising the relay winding 17.

If neither the switch 23 or the switch 42 is closed, then the engine may be started thus permitting any servicing that may be required. However, if the switch 42 is closed and the switch 55 opened, but the switch 23 is also open then the transistor 41 will be turned on, since base current will be supplied through the resistor 52 and the diode 51. However, once the switch 23 closes the diode 51 will be reverse biassed by current flow through the diode 53 and the transistor 41 will then turn off. This prevents the engine being started from the passenger seat with no driver in the vehicle.

Finally, if the voltage of the vehicle battery 10 is below the minimum pull-in-voltage of the relay, the system will not function. However, this would require an extremely low battery voltage on no load.

I claim:

1. An electrical system in a road vehicle, comprising, in combination: a starter motor, a manually operable switch for energizing said starter motor, a solenoid which when energized operates said starter motor, a normally closed relay contact between said starter switch and said solenoid, a relay winding for opening said contact, a battery, first and second supply lines coupled to said battery, a first control network connecting said relay winding between said supply lines when the driver's seat of said vehicle is occupied and the driver's seat belt is not fastened, and a second control network connecting said relay winding between said supply lines when the passenger's seat is occupied and the passenger's seat belt is not fastened, each of said first and second control networks comprising a seat switch which is closed when the associated one of said seats is occupied, a seat belt switch which is opened when the associated one of said seat belts is fastened, a first transistor having its collector/emitter path in series with said seat switch and said relay winding between said supply lines, a first resistor connected between said seat belt switch and the base of said first transistor, said seat belt switch when closed rendering said first transistor conductive so that said relay winding is energized when said seat switch is also closed, and latch circuit means connected to the base of said first transistor, rendering said first transistor conductive if said seat belt switch is opened before said seat switch is closed and comprising second and third transistors having their collector/emitter paths in parallel circuits between the base of said first transistor and one of said supply lines, and their bases connected in said parallel circuits so that said second and third transistors are both conductive or non-conductive simultaneously, each maintaining the other in its conductive or non-conductive state, a capacitor connected between said seat switch and the base of said third transistor, and a diode connecting said capacitor via said seat belt switch to said one of said supply lines.

2. A system as claimed in claim 1 in which the first control network also includes means connecting said relay winding between the supply lines if the driver's seat belt is fastened prior to the driver's seat being occupied.

3. A system as claimed in claim 1 in which the second control network also includes means connecting said relay winding between the supply lines if the passenger's seat belt is fastened prior to the passenger's seat being occupied.

4. A system as claimed in claim 1 in which the second control network also includes means connecting the relay winding between the supply lines if the passenger's seat is occupied but the driver's seat is not occupied.

* * * * *